Patented July 30, 1935

2,009,777

UNITED STATES PATENT OFFICE 2,009,777

COATING MATERIAL

Alfred L. Kronquest and Samuel C. Robison, Syracuse, N. Y., assignors to Continental Can Company, Inc., New York, N. Y., a corporation of New York No Drawing. Application April 4, 1931, Serial No. 527,857. Renewed May 7, 1935

5 Claims. (Cl. 134—17)

This invention relates to a coating material comprising a mixture of ingredients which may be prepared as a concentrated dough and later extended by a suitable liquid for the production of the coating material, and concerns certain changes in the material described and claimed in our co-pending application, Serial No. 520,464, filed March 5, 1931.

Such materials are particularly adapted for employment in sealing a container end to a body, and, for example, may be employed as a coating in the groove or channel of a can end, so that during the sealing operation in assembling the can end upon a body the coating material establishes a tight seal between the end and body. Sometimes the containers are not sterilized by a heat treatment and hence the coating material is not fixed or stabilized in its properties by phenomena of the nature of vulcanization. In such cases, it is desirable to have a coating material which will vulcanize of itself and in the cold, without a heat, which may be prepared and shipped cheaply and safely and which will remain stable for a considerable period of time: and which may be immediately prepared for use and brought into a satisfactory condition for coating the groove or channel or like element.

One of the features of the present invention therefore, is the provision of a coating material and a dough for producing the same which is stable and not liable to rapid deterioration and which may be extended by a volatile solvent and have incorporated therewith a vulcanization accelerator whereby to form a liquid coating material. The dough itself is of a putty-like consistency and is more easily handled and shipped than the coating material made therefrom.

Another object of the present invention is the provision of a coating material which solidifies rapidly and adheres well to the element upon which it is placed and is self-vulcanizing in the cold to a form which is permanently stable as a sealing element.

For the purpose of producing a coating material, an assemblage of various ingredients is initially made whereby a putty-like mass of dough is produced. This dough is shipped as such to the factory at which the coating material is to be employed: and is there extended by a suitable solvent to produce a coating material which is a uniform mass and usually of the approximate consistency of thick cream. To this coating material is added just prior to employment, a quantity of a vulcanizing accelerator.

A preferred formula for the manufacture of this dough is as follows:

| | |
|---|---|
| Rubber solution | 200 lbs. |
| Finely divided zinc oxide | 200 lbs. |
| Adhesive ester gum | 37 lbs. |
| Yellow iron oxide | 12 lbs. |
| Liquid petrolatum | 12 lbs. |
| Sulphur | 2 lbs. 6 oz. |
| Antioxidant | 1 lb. |

The rubber solution employed contains approximately 2 pounds of rubber to 4½ pounds of naphtha as a solvent. This rubber is incorporated to give elasticity to the compound and permit it to yield during the sealing operations and thus pack and seal the space between the can and cover and to maintain a permanent resiliency in the seal.

The zinc oxide is employed as a filler to reinforce the rubber. It has a natural affinity for the rubber, and is basic and reacts with the naturally occurring resins in rubber to form zinc soaps. The compounds thus formed tend to activate the accelerator.

The adhesive ester gum is employed to effect the adhesion of the coating to the tin plate, since the adhesion of rubber thereto is imperfect; and a preferred form of ester gum is that known as "Malay gum".

The liquid petrolatum is a mineral oil and operates as a plasticizer for the rubber and gum to combine them for mutual action, and serves to make the material more plastic and pliable and hence better adapted to fulfill its function of packing the space between the can and cover when so employed. The antioxidant is employed to prevent deterioration of the rubber by oxidation. Various materials are adapted for this purpose of serving to prevent the hardening of the mixture in the course of time. It has been found that the material comprising a mixture of 92.5% phenyl-alpha-naphthylamine and 7.5% meta-toluylenediamine, and commercially available under the name "Neozone C" is excellently adapted for this purpose.

The yellow iron oxide is pigment and is preferably employed to give a distinct yellow color for identification, and has an activating effect along with the zinc oxide upon the accelerator.

The sulphur is included as a vulcanizing agent.

The rubber solution is placed in a mixer and the other ingredients are then introduced and mixed until a plastic mass results which is of a putty-like consistency and is here denominated "coating dough". This dough may be shipped to the point of use. When it is to be employed, it is again placed in a suitable mixer in the ratio of 100 pounds of dough to 16 gallons of a suitable volatile solvent such as benzol, naphtha, or other suitable organic solvent, for the rubber gum and mineral oil, and stirred until a uniform mass results which usually has the consistency of a thick cream. It is obvious that greater or lesser proportions of solvent may be employed according to the exact consistency desired.

In order to render the above mixed coating vulcanizable at room temperature, an accelerator later described, which has been previously prepared in liquid form, is stirred into the coating in proper amount to effect complete and thorough vulcanization when the coating material is dried at room temperature. For example, the various accelerators described in patents and literature, and those sold commercially may be employed. It is found that in practice a satisfactory coating material is produced when the accelerator solution is made up by employing 80 grams of zinc isopropyl xanthate (an accelerator known commercially as "Zip"), made up to a volume of 400 cubic centimeters with a solvent comprising 60 parts of alcohol to 40 parts of water: with the addition thereto of 40 cubic centimeters of ether. This quantity of accelerator solution is then incorporated with 13 gallons of the creamy, diluted coating material.

The material is then ready for employment and may be placed upon the tin plate, where it rapidly evaporates and deposits an elastic film tightly adherent to the tin plate. It vulcanizes itself and becomes proof against the action of oil, hydrocarbons or fats in about 3 to 4 days' time without the aid of artificial heat. This comparatively rapid vulcanization occurs since the solvent has left the coating mixture. It is found in practice that the creamy material is only usable for a limited period of time, being around two weeks with the aforesaid proportions, after the accelator has been added: as beyond that time it will slowly form a gel and become unusable, even though the solvent is prevented from evaporation.

It is obvious that the preferred formula is but one of many which may be employed, since the invention may be modified in many ways both as to the selection of ingredients and as to the quantities employed without departing from the spirit of the intended claims:

We claim:

1. A liquid coating material for sealing the seams of cans and like containers comprising a mixture of rubber, zinc oxide, an adhesive ester gum, a plasticizer for the rubber and gum, sulphur, a vulcanization accelerator cooperative with said oxide, and an antioxidant for the rubber, in a volatile solvent for the rubber and gum, the quantity of zinc oxide being greatly in excess by weight of the combined quantities of rubber and ester gum.

2. The method of preparing a coating material for can ends which comprises mixing a solution of rubber in a volatile solvent with finely divided zinc oxide, adhesive ester gum, liquid petrolatum, and sulphur to form a uniform dough, mixing the dough with a volatile solvent to form a cream-like coating material, and introducing a vulcanization accelerator into the material shortly before use.

3. A liquid coating material for sealing the seams of cans and like containers comprising a mixture of 200 pounds of rubber solution containing approximately 2 pounds of rubber to 4½ pounds of a volatile solvent for the rubber, approximately 200 pounds of zinc oxide, approximately 37 pounds of adhesive ester gum, approximately 2½ pounds of sulphur, approximately 1 pound of antioxidant for the rubber, and approximately 170 grams of a vulcanization accelerator for the rubber.

4. A liquid coating material for sealing the seams of cans and like containers comprising a mixture of rubber, an adhesive gum, a plasticizer for the rubber and gum and having the non-drying and non-evaporating properties of petrolatum, sulphur, and a vulcanization accelerator for the rubber, in a volatile solvent for the rubber and gum, and zinc oxide suspended therein in quantity by weight substantially three times that of rubber.

5. The method of preparing a liquid coating material for can ends which comprises mixing a solution of rubber in a volatile solvent with finely divided zinc oxide in quantity by weight greatly in excess of the quantity of rubber, adhesive ester gum, liquid petrolatum, sulphur, and an anti-oxidant for the rubber to form a uniform dough, mixing the dough with a volatile solvent to form a cream-like coating material, and introducing a vulcanization accelerator into the material shortly before using.

ALFRED L. KRONQUEST.
SAMUEL C. ROBISON.